United States Patent [19]

Degen et al.

[11] Patent Number: 5,435,957
[45] Date of Patent: Jul. 25, 1995

[54] METHOD OF PREPARING A SUPPORT MATERIAL FOR USE WITH A FILTRATION MEDIUM

[75] Inventors: Peter J. Degen, Huntington; Colin F. Harwood, Glen Cove, both of N.Y.; John B. Ronan, Harrington Park, N.J.; Jason Mei, East Meadow, N.Y.

[73] Assignee: Pall Corporation, East Hills, N.Y.

[21] Appl. No.: 116,901

[22] Filed: Sep. 3, 1993

[51] Int. Cl.⁶ .............................................. B28B 11/08
[52] U.S. Cl. ..................... 264/162; 264/175; 264/280; 264/DIG. 48; 156/153; 425/366
[58] Field of Search ................... 156/153, 209, 244.24; 264/162, 175, 177.17, 177.19, 210.2, 210.5, DIG. 48, 280; 425/363, 366; 210/508

[56] References Cited

U.S. PATENT DOCUMENTS

| | | |
|---|---|---|
| 3,591,010 | 7/1971 | Pall et al. |
| 3,592,767 | 7/1971 | Pall |
| 3,716,436 | 2/1973 | Pall et al. |
| 3,867,294 | 2/1975 | Pall et al. |
| 4,033,881 | 7/1977 | Pall |
| 4,184,966 | 1/1980 | Pall |
| 4,340,479 | 7/1982 | Pall |
| 4,609,465 | 9/1986 | Miller |
| 4,693,985 | 9/1987 | Degen et al. |
| 5,006,235 | 4/1991 | Cooper |

OTHER PUBLICATIONS

"Beloit Wheeler" Brochure (Beloit Corporation Form. No. BMI 062 1113M Rev).

"Beloit Manhatten Supertex ® Roll Covers" Brochure (Beloit Corporation Form No. BMD1027 VG 10/90 3M).

"Beloit Wheeler Model 700" Information Sheet (Beloit Corporation).

*Primary Examiner*—Robert A. Dawson
*Assistant Examiner*—W. L. Walker
*Attorney, Agent, or Firm*—Leydig, Voit & Mayer, Ltd.

[57] ABSTRACT

The present invention provides a method of preparing a support for a filtration medium comprising passing a sheet of nonwoven fibrous polymeric material having first and second sides through a calender which comprises a nondeformable roll and a resilient roll, the nondeformable roll being maintained at a temperature below the melting temperature of the material, so as to increase the smoothness of the first side of the material which contacted the resilient roll. A filtration medium support material prepared in accordance with the method of the present invention, as well as a filter comprising a filtration medium and that filtration medium support material, are also provided by the present invention.

21 Claims, No Drawings

METHOD OF PREPARING A SUPPORT MATERIAL FOR USE WITH A FILTRATION MEDIUM

TECHNICAL FIELD OF THE INVENTION

The present invention relates to support materials for filtration media and methods for their preparation.

BACKGROUND OF THE INVENTION

Filtration media have been used for the filtration of fine particles from fluids, particularly liquids, for many years. Such filtration media are available in a variety of materials to meet particular filtration requirements. Microporous membranes, such as those described in U.S. Pat. No. 4,340,479, are particularly well-suited to the filtration of fine particulate matter from fluids, especially liquids.

Although microporous membranes possess the ability to remove fine particles, they unfortunately suffer from a lack of mechanical strength. As a result, one or more supportive materials are often mated with a microporous membrane in order to provide the membrane with an adequate degree of mechanical support. This is particularly the case when the microporous membrane is pleated for use in a filtration element.

Support materials of various compositions and structures have been used in conjunction with the microporous membranes, including, e.g., nonwoven fibrous materials such as polyesters and polypropylenes. The particular material used in a filtration medium support material preferably possesses high strength, good edge flow characteristics, and a low pressure drop across the material. Nonwoven fibrous materials prepared from fibers which are at least about 50 microns in diameter provide an exceptional level of performance in each of these areas.

The use of such nonwoven materials as supports for filtration media, especially microporous membranes, however, is not without its problems. In particular, materials prepared from fibers in excess of about 20 microns in diameter typically possess a relatively rough or coarse surface. Thus, when a microporous membrane is mated with such a support material, the support material, due to its roughness or unevenness, can damage and introduce defects into the membrane, particularly when such a membrane is pleated. One example of such a defect is referred to as "coining." Coining occurs when the support material, upon being compressed with a membrane during the preparation of a filtration element, leaves a permanent imprint of its surface in the membrane. The membrane is therefore permanently compressed in the area of the imprint, and this compression results in a local lessening of the membrane's thickness, which in turn reduces the resolution, or titer reduction, of the membrane. In a worst case, a support material will actually penetrate the membrane, thereby rendering the membrane defective and allowing undesirable particles to pass through the filter so as to contaminate the product stream.

It is known that materials which are prepared from fibers which are smaller in diameter offer superior surface smoothness. However, the advantage offered by those materials in the area of membrane compatibility is countered by their increased pressure drop, decreased edge flow characteristics, and decreased column strength which is required to support the pleats of a pleated membrane. Alternatively, such fine-fibered material can be inserted as a cushioning layer between relatively coarse large-fibered material and a microporous membrane; however, this approach decreases the efficiency of the filtration element in several ways. In addition to increasing the pressure drop across the element, the extra layer adds cost and complexity to the element. Moreover, the number of pleats that can be prepared from such a structure are reduced. This reduction in the number of pleats reduces both the surface area available for filtration and the dirt capacity of the filtration element.

Thus, there exists a need for a support material which has an acceptable level of performance in the areas of pressure drop, strength, and edge flow characteristics, but which does not unduly damage a filtration medium, especially a microporous membrane, when mated therewith to form a filtration element. The present invention provides such a support material, and a method for preparing the support material, which provides such advantages while avoiding the aforesaid disadvantages. These and other advantages of the present invention, as well as additional inventive features, will be apparent from the description of the invention provided herein.

BRIEF SUMMARY OF THE INVENTION

The present invention provides a method for the preparation of a support for a filtration medium comprising passing a sheet of nonwoven fibrous polymeric material having first and second sides through a calender which comprises a nondeformable roll and a resilient roll, the nondeformable roll being maintained at a temperature below the melting temperature of the material, so as to increase the smoothness of the first side of the material which contacted the resilient roll.

A filtration medium support prepared in accordance with the method of the present invention, as well as a filter comprising a filtration medium and that filtration medium support, are also provided by the present invention.

DESCRIPTION OF THE PREFERRED EMBODIMENTS

The present invention provides a method which is able to provide a filtration medium support material which has; an acceptable level of performance in the areas of pressure drop, strength, and edge flow, but which does not unduly damage a high-resolution membrane when mated therewith. The present inventive method accomplishes this result by processing a conventional nonwoven support material, which may be prepared from relatively large diameter fibers, in a manner such that the surface smoothness of at least one side of the material is increased without substantially adversely affecting the pressure drop, strength, and edge flow characteristics of the material. The resulting support material has a smoothness of a support material prepared from smaller diameter fibers while substantially retaining the pressure drop, strength, and edge flow characteristics of a support material prepared from larger diameter fibers.

In particular, the present invention provides a method of preparing a support material for a filtration medium comprising passing a sheet of nonwoven fibrous polymeric material having first and second sides through a calender which comprises a nondeformable roll and a resilient roll, the nondeformable roll being maintained at a temperature above about 25° C. and below the melting temperature of the material, so as to increase the smoothness of the first side of the material which contacted the resilient roll.

Any type of nonwoven material suitable for a filtration medium support material can be processed in accordance with the present inventive method with advantageous results. Typically, such nonwoven material comprises thermoplastic fibers prepared from polyamides, polyesters, polyolefins, aramides, fluoropolymers, and mixtures thereof. Nonwoven materials which comprise thermoplastic fibers prepared from polypropylene and polyvinylidene fluoride are most typical and can be advantageously processed in accordance with the present invention.

The fibers used to form the nonwoven material may have any suitable diameter. In particular, the fiber diameter should be sufficiently large to provide the desired pressure drop, strength, and edge flow characteristics, yet small enough to provide the desired smoothness after processing in accordance with the present invention. The present invention provides for a smoother surface for any given fiber diameter. Thus, fibers with diameters larger than those typically used in conventional supports can be utilized in conjunction with the present invention so as to provide a support material with a smoothness equivalent to that associated with a conventional support material prepared from fibers of the more typical smaller diameter. Alternatively, an improved smoothness can be attained with a support material prepared from fibers of the typical diameters used in conventional supports.

Nonwoven material prepared from fibers which are at least about 10 microns in diameter is advantageously utilized inasmuch as such a support material will exhibit acceptable pressure drop and edge flow characteristics, as well as an adequate level of smoothness, after processing. Nonwoven material prepared from fibers having a diameter of from about 15 to about 50 microns is preferably utilized in conjunction with the present invention, with a support material prepared from fibers having a diameter ranging from about 20 to about 40 microns being most preferred.

The nonwoven materials that are most preferably used to prepare support materials in accordance with the present inventive method include, for example, polypropylenes such as Lutrasil® (20 micron fibers, Lutrasil, Freudenberg, Germany) and Typar® (45 micron fibers, Reemay, Old Hickory, Tenn.), polyesters such as Reemay® (20 micron fibers, Reemay, Old Hickory, Tenn.), and nylons such as Cerex® (20 micron fibers, Fiberweb North America, Simpsonville, S.C.).

In accordance with the present invention, the material is passed through a calender, preferably on a continuous basis, which comprises a nondeformable roll and a resilient roll. The nondeformable roll can be manufactured from any material which will not deform upon contact with the nonwoven material, e.g., any suitable plastic material or metal. The nondeformable roll preferably is a metal roll, more preferably a steel roll, and most preferably a stainless steel roll, although nickel coated and chromium plated rolls may also be advantageously utilized. The resilient roll can consist of any material which provides a degree of resiliency such that the material, when subjected to the inventive process, is provided with a surface which is smoother than that which it possessed prior to undergoing the method. Advantageously, the resilient roll has a plastic or synthetic covering, such as silicone rubber, urethane, or nylon, is a fiber roll, such as a cotton-filled roll, or, preferably, has a combined fiber and thermosetting resin covering, such as one of the Beloit Supertex® coverings.

In carrying out the present inventive method, there are several variables that can have a substantial effect upon the final properties of the material. Those variables include the temperature of the nondeformable roll, the temperature of the resilient roll, the gap setting or interference between the two rolls, and the speed of material through the roll-to-roll nip area.

With regard to the temperature variable, the nondeformable and resilient rolls can be maintained at any suitable temperatures. The nondeformable roll is preferably maintained between room temperature, e.g., 20°–25° C., and a temperature below the melting temperature of the support material. Any further increase would only tend to deform the material and destroy its structure. Such a material would then exhibit an increase in at least its pressure drop to the point where the material would be rendered effectively unusable for purposes of preparing a suitable filtration element. The temperature of the nondeformable roll is more preferably higher than 25° C., e.g., at least about 50° C. or 100° C., and most preferably at least as high as the glass transition temperature of the support material, in order to impart the desired degree of smoothness to the support material. Accordingly, the temperature of the nondeformable roll is most preferably maintained at a temperature between the glass transition temperature and the melting temperature of the support material. The nondeformable roll may be heated by any suitable means.

The resilient roll is preferably not directly heated, although it may be warmed to some extent due to the proximity or surface contact of the resilient roll with the nondeformable roll. Both sides of the material are changed, i.e., smoothed, when subjected to the present inventive method, and the side that contacts the resilient roll is the most improved as to smoothness.

The gap setting or interference between the two rolls is maintained to compress, but not crush, the material. Excessive compression and deformation of the material will increase the pressure drop and reduce the edge flow rate such that the material is no longer suitable for use in a filtration element. In contrast, insufficient compression will not impart the desired degree of smoothness to the support material. Sufficient compression of the material may be maintained by conventional roll-to-roll gap setting methods in conjunction with the pressure loading of one roll into the other. The nondeformable roll and the resilient roll may contact one another or may be advantageously separated, e.g., by about 5% to about 80% of the thickness of the material prior to passage through the calender. One of the nondeformable and resilient rolls is preferably pressure loaded into the other roll at a pressure of at least about 50 pounds per linear inch. The pressure loading more preferably ranges from about 50 to about 3,000 pounds per linear inch or more, with the most preferred range being about 150 to about 800 pounds per linear inch.

The rate at which the material passes through the calender also affects the properties of the processed material. If the material passes through the calender too quickly, the smoothness of the material is not increased to the most desirable extent. This is particularly the case when the nondeformable roll is heated, resulting in an inadequate amount of heat being transferred to the material if the material passes through the calender too quickly. Of course, when the nondeformable roll is heated, running the material through the calender at too slow a rate may result in over-heating of the material, resulting in the same type of damage to the material that is experienced when the temperature of the nondeformable roll is too high. Advantageously, the material passes through the calender at a rate of about 5 feet/min to about 500 feet/min, preferably at a rate of about 5 feet/min to about 100 feet/min and most preferably at a rate of about 10 feet/min to about 100 feet/min.

After the material exits the calender, an increase in the smoothness of the side of the material which contacted the resilient roll is experienced. Advantageously, this change in smoothness of one side of the material after calendering as compared to the initial smoothness results in a decrease by at least about 15% in the force required to slide the material against itself (in the manner described more fully in the examples below). Preferably the decrease in the sliding force is at least about 25%, more preferably at least about 40%, and most preferably at least about 50%. In quantitative terms, the sliding force is preferably no more than about 20 ounces, more preferably no more than about 15 ounces, and most preferably no more than about 12 ounces, as determined by the force required to slide the material against itself.

The permeability of the material may be affected as a result of subjecting it to the method of the present invention. Permeability is a measure of the ability of a fluid to penetrate through a medium, and often it is measured as the difference in pressure across the medium when a fluid (i.e., liquid or gas) is passed through the medium at a known rate. This measurement is known as delta P, whereas the flow through the medium under a constant driving pressure is commonly known as the Frazier number. The delta P or Frazier number of the material is preferably essentially unaffected by the present inventive method or at least not so adversely affected as to interfere with the intended use of the material as a filtration medium support material.

If desired, a material which has already been subjected to the method of the present invention can be turned over and passed through the calender a second time. This provides a material in which both sides have an increased degree of surface smoothness as compared to their preprocessing smoothness.

Support materials prepared using the method of the present invention can be mated with any suitable filtration medium, e.g., microporous membrane, with the smooth side contacting the filtration medium, to form a filtration element. Such an element can be used in a flat form or, preferably, is configured into a pleated form. When both sides of a material have been subjected to the method of the present invention, such material can be advantageously used to prepare a dual-layered filtration element. In such an element, two filtration media are placed into a cartridge, with the aforesaid two-sided smoothed support material located therebetween. If desired, two additional pieces of support material, also prepared pursuant to the present invention, can be mated to the upstream side of the first filtration medium and the downstream side of the second filtration medium, with their smooth sides contacting the filtration media. Such an arrangement can be pleated and inserted into a device, e.g., a cartridge, for use in any suitable filtration process.

The following examples further illustrate the present invention but, of course, should not be construed as in any way limiting its scope as defined by the claims.

EXAMPLE 1

This example illustrates the preparation of a support material in accordance with the method of the present invention.

Typar® 3121 polypropylene fabric was passed through a calender at the rate of 20 ft/min. Such fabric has two distinct surfaces, which are referred to herein as the inside and outside surfaces. The calender consisted of a chrome-plated steel roll, 6 inches in diameter and 12 inches wide, heated to 135° C and a Supertex® roll, 9 inches in diameter and 12 inches wide, which was not heated. There was no gap between the rolls, and the pressure loading of one roll into the other was 1500 psig. Some of the fabric was passed through the calender such that the inside surface contacted the Supertex® roll, while other of the fabric was passed through the calender such that the outside surface contacted the Supertex® roll.

The properties of the fabric before and after processing are set forth below, wherein the side of the fabric sample contacting the Supertex® roll is identified in parentheses adjacent the processed fabric indication. The determination of fabric smoothness was made by measuring the force in ounces to slide a fabric surface against itself. The procedure consisted of securely attaching a fabric sample of known size to a standard stainless steel sled (15 in$^2$) providing 3.5 oz/in$^2$ load, and then measuring the force to move the sled across the same size of the fabric being tested. The testing was repeated in several areas of the fabric, and the average of the test results reported as the slide force.

| Property | Original Fabric | Processed Fabric (Inside Surface) | Processed Fabric (Outside Surface) |
| --- | --- | --- | --- |
| Weight (oz/yd$^2$) | 1.15 | 1.18 | 1.18 |
| Thickness (mils) | 7.8 | 4.8 | 4.5 |
| ΔP8 (inch H$_2$O) | 0.03 | 0.07 | 0.08 |
| Inside/Inside Slide Force (oz) | 22.0 | 16.0 | — |
| Outside/Outside Slide Force (oz) | 19.0 | — | 16.0 |

The present invention resulted in an improvement of smoothness of the inside surface of the support material of about 27% as indicated in the reduction in slide force. The outside surface of the support material was improved about 16% by the present invention, as indicated in the reduction in slide force.

EXAMPLE 2

This example further illustrates the preparation of a support material in accordance with the method of the present invention.

Polyvinylidene fluoride (PVDF) fabric was passed through a calender at the rate of 10 ft/min. Such fabric has two distinct surfaces, which are referred to herein as the inside and outside surfaces. The calender consisted of a chrome-plated steel roll heated to 160° C. and a Supertex® roll which was not heated. There was no gap between the rolls, and the pressure loading of one roll into the other was 2500 psig. Some of the fabric was passed through the calender such that the inside surface contacted the Supertex ® roll, while other of the fabric was passed through the calender such that the outside surface contacted the Supertex ® roll.

The properties of the fabric before and after processing are set forth below, wherein the side of the fabric sample contacting the Supertex ® roll is identified in parentheses adjacent the processed fabric indication. The determination of fabric smoothness was made in the same manner described in Example 1.

| Property | Original Fabric | Processed Fabric (Inside Surface) | Processed Fabric (Outside Surface) |
|---|---|---|---|
| Weight (oz/yd$^2$) | 2.1 | 2.1 | 2.5 |
| Thickness (mils) | 11.2 | 4.0 | 4.0 |
| ΔP8 (inch H$_2$O) | 0.05 | 0.28 | 0.38 |
| Inside/Inside Slide Force (oz) | 40.8 | 8.6 | — |
| Outside/Outside Slide Force (oz) | 33.6 | — | 11.4 |

The present invention resulted in an improvement of smoothness of the inside surface of the support material of about 79% as indicated in the reduction in slide force. The outside surface of the support material was improved about 66% by the present invention, as indicated in the reduction in slide force.

All of the references cited herein are hereby incorporated in their entireties by reference.

While this invention has been described with an emphasis upon a preferred embodiment, it will be obvious to those of ordinary skill in the art that variations of the preferred products and processes may be used and that it is intended that the invention may be practiced otherwise than as specifically described herein. Accordingly, this invention includes all modifications encompassed within the spirit and scope of the invention as defined by the following claims.

What is claimed is:

1. A method of preparing a support material for a filtration medium comprising passing a sheet of nonwoven fibrous polymeric material having first and second sides through a calender which comprises a nondeformable roll and a resilient roll, the nondeformable roll being maintained at a temperature above about 25° C. and below the melting temperature of the material, so as to increase the smoothness of the first side of the material which contacted the resilient roll.

2. The method of claim 1, wherein said nondeformable roll is maintained at a temperature above about 50° C. and below the melting temperature of the material.

3. The method of claim 2, wherein said nondeformable roll is maintained at a temperature above about 100° C. and below the melting temperature of the material.

4. The method of claim 1, wherein said nondeformable roll is maintained at a temperature between the glass transition temperature and the melting temperature of the material.

5. The method of claim 1, wherein said nondeformable roll is a metal roll.

6. The method of claim 1, wherein said nondeformable roll is a steel roll.

7. The method of claim 1, wherein said resilient roll is a roll having a covering prepared from a material selected from the group consisting of fibers, silicone rubber, urethane, nylon, and a combined fiber and thermosetting resin.

8. The method of claim 1, wherein said resilient roll is a cotton-filled roll.

9. The method of claim 1, wherein said resilient roll has a combined fiber and thermosetting resin covering.

10. The method of claim 1, wherein said nondeformable roll is a chrome-plated steel roll and said resilient roll has a Beloit Supertex ® covering.

11. The method of claim 1, wherein the change in smoothness of the first side of the material after calendering as compared to the initial smoothness results in a reduction of at least about 15% in the force required to slide the material against itself.

12. The method of claim 11, wherein the change in smoothness of the first side of the material after calendering as compared to the initial smoothness results in a reduction of at least about 25% in the force required to slide the material against itself.

13. The method of claim 1, wherein the fibers which comprise the material are selected from the group consisting of polyamides, polyesters, polyolefins, aramides, fluoropolymers, and mixtures thereof.

14. The method of claim 13, wherein the fibers which comprise the material are selected from the group consisting of polypropylene and polyvinylidene fluoride.

15. The method of claim 1, wherein the fibers which comprise the material are at least about 10 microns in diameter.

16. The method of claim 15, wherein the fibers which comprise the material range from about 15 to about 50 microns in diameter.

17. The method of claim 16, wherein the fibers which comprise the material are selected from the group consisting of polypropylene and polyvinylidene fluoride.

18. The method of claim 1, wherein the rate at which the material passes through the calender ranges from about 5 to about 100 feet/min.

19. The method of claim 1, wherein said nondeformable roll and said resilient roll are spaced apart by about 5% to about 80% of the thickness of the material prior to passage through the calender.

20. The method of claim 1, wherein said nondeformable roll and said resilient roll are pressure loaded against one another at a pressure of at least about 50 pounds per linear inch.

21. The method of claim 1, which method further comprises passing the calendered material through the calender such that the second side of the material contacts the resilient roll so as to increase the smoothness of the second side of the material.

* * * * *